Sept. 30, 1930.  W. SHELDON  1,776,797
PACKING FOR ROTARY WELL DRILLING
Filed Aug. 15, 1928   2 Sheets-Sheet 1
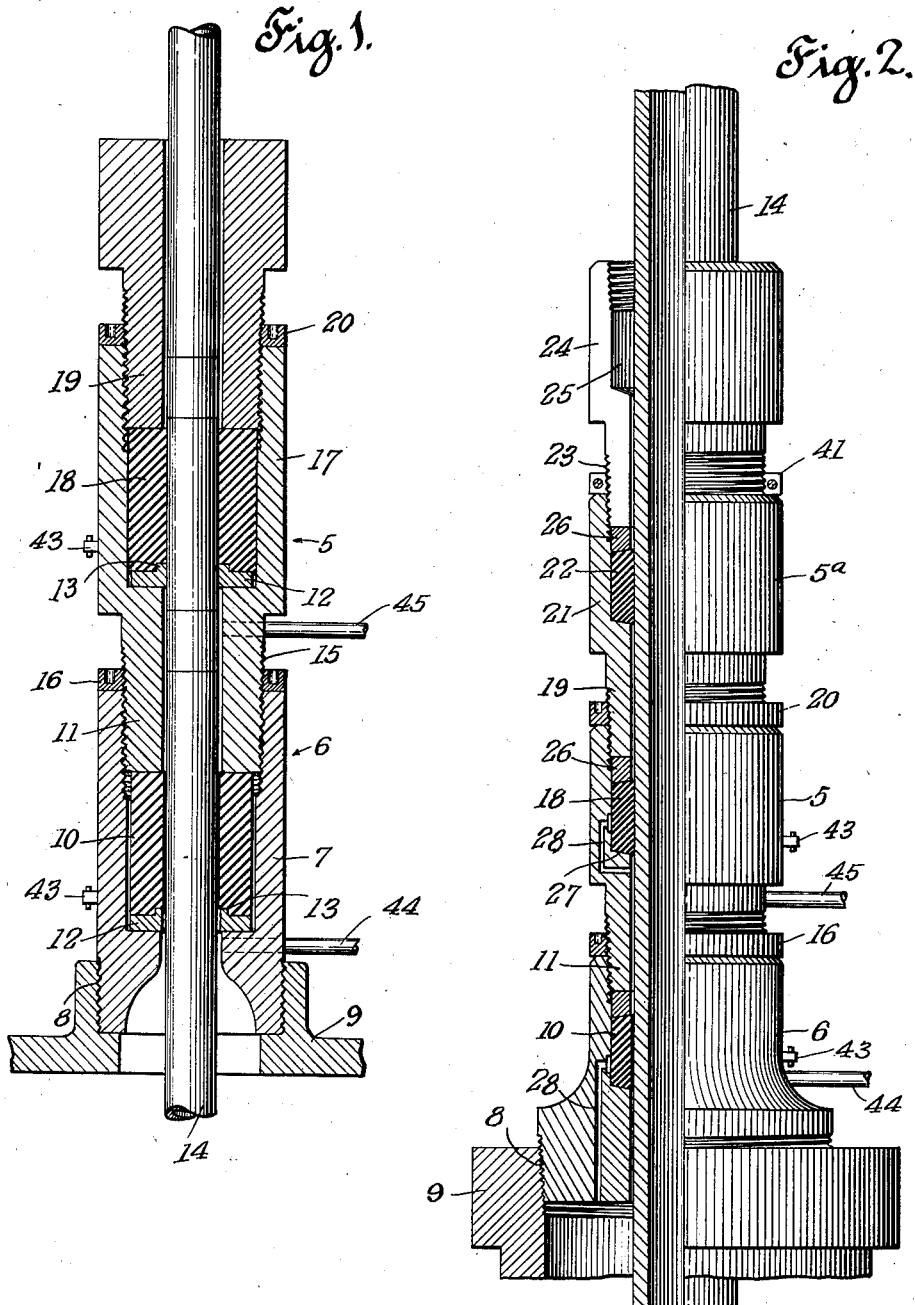
INVENTOR
Waldo Sheldon
BY
Philip S. McLean
ATTORNEY

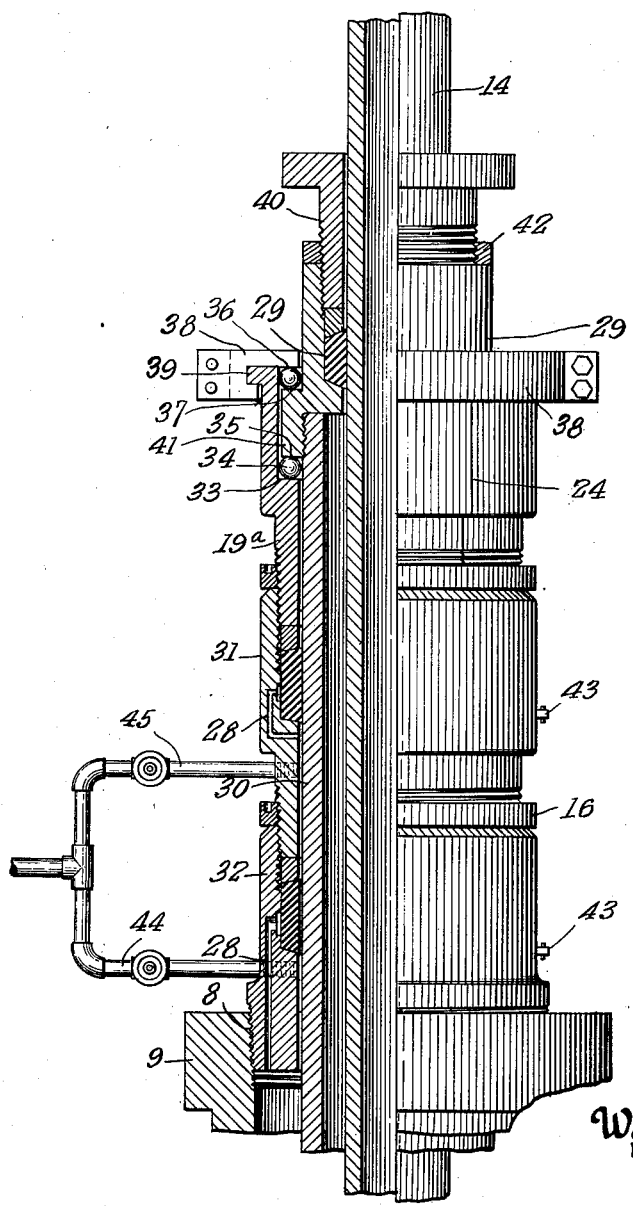

Patented Sept. 30, 1930

1,776,797

UNITED STATES PATENT OFFICE

WALDO SHELDON, OF SOUTH NORWALK, CONNECTICUT

PACKING FOR ROTARY WELL DRILLING

Application filed August 15, 1928. Serial No. 299,739.

The objects of this invention are to provide packing for rotary drills by which a tight joint can be maintained with the drill pipe over extended periods and under extreme conditions, which will enable a proper control while coming out of the hole under pressure and which will be efficient and practical in every way.

The foregoing and other desirable objects are attained by certain novel features of construction, combination and relations of parts as hereinafter set forth and broadly claimed.

The drawings accompanying and forming part of the specification illustrate some of the commercial embodiments of the invention, it being understood that the structure may vary without departure from the true spirit and broad scope of the invention.

Fig. 1 is a broken vertical sectional view of the multiple independently adjustable form of packing; Fig. 2 is a similar view of a modified form of the inventon; Fig. 3 is a like view of still another modification of the invention.

The present invention is based in part on applications 65,109 filed October 27, 1925, and 177,539 filed March 23, 1927.

One of the important novel features of the invention is the construction of the packing in the form of multiple independently adjustable units and the provision of means for setting and securing certain of said units out of service relation, so that they will not wear during use of the working or service packing unit, but may be brought into service when the working unit is worn and requires repacking.

In the illustrations, the normal working or service packing is designated 5 and the reserve packing is designated 6. The latter is shown as a stuffing box 7 having a suitable screw connection at 8 with the well head flange 9 and containing a rubber or another suitable resilient material packing ring 10 engaged by the gland 11 which screws into the top of the box. The expansible packing ring is shown as supported at the bottom by a flange 12 seating in the bottom of the box and having a central upstanding hub or shoulder 13 surrounding the drill pipe 14 to assist in the spreading or expansion of the rubber. The screw shank 15 of the gland is long enough to extend up out of the box and provision is made for locking the gland in any desired position of adjustment, the same taking the form of a lock nut 16 on the stem of the gland and adapted to be set down into abutment with the end of the box.

The gland itself is shown as socketed to form a box 17 for the service packing 18, which is set by a screw gland 19, adapted like the first to be secured in adjusted relation by a locking ring 20. The rubber of the second packing is shown supported by a plate 12 similar to the first.

The drill pipe 14 is shown as of the flush joint construction, so as to pass freely through the stuffing boxes. In practise, the inside gland is backed out sufficiently as indicated in Fig. 1, so that practically no wear comes on the inside packing 10, the gland being locked in this condition by the lock nut 16. With the inner stuffing box thus out of service and locked in the reserve condition, the outer gland is turned down to bring the outer packing into service in which relation it may be secured by the lock nut 20. The outer gland may be adjusted from time to time to take up the wear on the service packing and when this packing becomes worn to such an extent as to require renewal, the lock nut 16 of the inside packing is released and the inside gland is then turned down to bring the reserve packer 10 into service. When this is done, the outer gland is backed off, the worn service packing is removed and repaired or replaced by a new packing, after which this outer packing may be brought into service and the inner packing again released so as to keep it always in reserve ready for use any time the service packing gets worn.

In Fig. 2, there is shown in addition to the regular service packing at 5 and the reserve packing at 6, an extra reserve packing at 5ᵃ adapted to relieve or to take the place of the regular service packing.

The extra reserve packing at 5ᵃ is shown provided by constructing the outer gland 19 with a box 21 for a packer 22 to which pressure is applied by a third gland 23, the latter being indicated at 24 as of split construction, enabling the two halves of the same to be applied about the sides of the drill pipe any time it may be considered necessary. The latter gland is also indicated as formed with a box 25 for another packing if that be found necessary. To prevent any wearing or cutting tendency on the rubbers, thrust rings 26 are shown interposed between the ends of the glands and packers to take the rotating thrust of the glands. These rings are indicated as having bevelled under faces and the boxes are shown as similarly bevelled at 27, so that the effect is to crowd the ends of the packing rings inwardly against the pipe. To take advantage of pressure in the well to hold the packing or packings in place, ports or passages 28 may be provided in the box members for carrying pressure from the space surrounding the drill pipe in back of the intermediate portions of the packing rings to force the same into close contact with the drill pipe.

In Fig. 3 the drill pipe is shown as working through a stuffing box at 29 into the equivalent of a polished rod 30, which is packed into the well head 9 through the service stuffing box 31 and reserve stuffing box 32. To permit turning of the rod 30 with the drill pipe, the upper gland 19ᵃ is shown as having a ball race seat 33 for the bearing balls 34 engaged by the shoulder 35 of a collar 41 screwed on to the upper end of the rod. The rod is in turn held down by the bearing balls 36 engaging a shoulder 37 on the collar 41 and working under the flange of a split clamp ring 38 secured over the flanged or shouldered portion 39 of the upper stuffing box 19ᵃ. This arrangement holds the rod down against pressure and permits the drill pipe to be withdrawn through the stuffing box 29 of the rod. The stuffing box 29 is located in and forms part of the rod collar 41, it having a gland 40 screwing into the upper end of the box to seal the packing against the drill pipe.

If desired, a split form of lock nut may be placed about the split gland as indicated at 41 in Fig. 2 to assist in holding the parts of the split glands together and for the purpose of holding this gland in desired relation.

In the form of the invention illustrated in Fig. 3, where the polish rod turns with the drill pipe, the two may be held so as to rotate together for instance by setting down the top gland 40 to force the packing 29 into sufficient gripping engagement with the rod and securing it in this relation as by means of the lock nut 42. Also this packing 29 may be of different material from the packing in the other stuffing boxes or have a greater surface engagement with the pipe than the other packings, so that the rod will rotate in the boxes 31 and 32, turning with the drill pipe 14. As a further means of insuring rotation of the rod in its stuffing boxes, lubricating connections or attachments for supplying a proper lubricant to the packing in the boxes 31 and 32 may be provided as indicated at 43.

In the same manner lubricant may be supplied to the packings for the drill pipe as indicated at 43 in Figs. 1 and 2.

To protect the packing against injurious gases and the like, the liquid sealing medium may be introduced below or between the packings as through pipe connections shown at 44 and 45, such sealing medium being introduced under sufficient pressure to overcome gas pressure. In the case of introducing the sealing medium between the packings as through the pipes 45, such medium will act as a complete liquid seal filling the annular space between the lower and upper packing fully protecting the upper packing from the gas and to an extent protecting the lower packing.

What is claimed is:

1. For use with rotary drills in drilling in against pressure, means for facilitating renewal of the packing about the drill pipe which rotates in the casing, comprising in combination two complete packings set one rotatably in the top of the other and each consisting of packing material and a gland which can be screwed down about the pipe to compress the packing material in substantially gas-tight relation on the pipe, the packing material and gland of the upper packing being carried by the gland of the lower packing and the packing material of the lower packing being mounted in a relatively stationary stuffing box structure and a lock nut engaged with the gland of the lower packing and cooperable with the stationary box structure of the lower packing for preventing rotation of said gland carrying the upper packing by the rotation of the drill pipe and for locking said gland in position with the lower packing out of service contact with the drill pipe while the upper packing is in service, said lock nut being readily releasable to permit said gland being turned down to bring the lower packing into service relation with the drill pipe while the packing material of the upper packing is being renewed and adapted after renewal of said upper packing to secure said gland in the released out of service relation of the lower packing, when the renewed packing material in the upper packing is again placed in service relation by the turning down of the upper gland.

2. For use with rotary drills in drilling in against pressure, means for facilitating renewal of the packing about the drill pipe which rotates in the casing, comprising in combination two complete packings set one rotatably in the top of the other and each consisting of packing material and a gland which can be screwed down about the pipe to compress the packing material in substantially gas-tight relation on the pipe, the packing material and gland of the upper packing being carried by the gland of the lower packing and the packing material of the lower packing being mounted in a relatively stationary stuffing box structure and a lock nut engaged with the gland of the lower packing and cooperable with the stationary box structure of the lower packing for preventing rotation of said gland carrying the upper packing by the rotation of the drill pipe and for locking said gland in position with the lower packing out of service contact with the drill pipe while the upper packing is in service, said lock nut being readily releasable to permit said gland being turned down to bring the lower packing into service relation with the drill pipe while the packing material of the upper packing is being renewed and adapted after renewal of said upper packing to secure said gland in the released out of service relation of the lower packing, when the renewed packing material in the upper packing is again placed in service relation by the turning down of the upper gland and a second lock nut for securing the upper gland in its adjusted relation, whereby when required, said upper gland may be unscrewed and locked with the upper packing in the out-of-service relation at a time when the lower lock nut has been released and the lower gland has been turned down to set the lower packing in its service relation.

In testimony whereof I affix my signature.

WALDO SHELDON.